United States Patent
Peel et al.

(10) Patent No.: US 6,711,494 B2
(45) Date of Patent: Mar. 23, 2004

(54) DATA FORMATTER FOR SHIFTING DATA TO CORRECT DATA LANES

(75) Inventors: Eric Peel, Mission Viejo, CA (US); Bradley Roach, Newport Beach, CA (US); Qing Xue, Irvine, CA (US)

(73) Assignee: Emulex Corporation, Costa Mesa, CA (US)

( * ) Notice: Subject to any disclaimer, the term of this patent is extended or adjusted under 35 U.S.C. 154(b) by 79 days.

(21) Appl. No.: 10/000,848

(22) Filed: Nov. 30, 2001

(65) Prior Publication Data

US 2003/0023819 A1 Jan. 30, 2003

Related U.S. Application Data

(60) Provisional application No. 60/309,064, filed on Jul. 30, 2001.

(51) Int. Cl.[7] ............................................. G06F 12/00
(52) U.S. Cl. .................... 701/201; 365/78; 365/189.12; 365/240; 711/217; 711/219
(58) Field of Search .................... 365/78, 189.08, 365/189.12, 230.03, 236, 239, 240; 711/201, 212, 215, 217, 219, 220

(56) References Cited

U.S. PATENT DOCUMENTS

| | | | |
|---|---|---|---|
| 4,829,475 A | * 5/1989 | Ward et al. ................... 365/78 |
| 4,931,925 A | 6/1990 | Utsumi et al. | |
| 5,226,169 A | 7/1993 | Gregor | |
| 5,473,756 A | * 12/1995 | Traylor ........................ 710/57 |
| 5,651,127 A | * 7/1997 | Gove et al. .................. 711/202 |
| 5,774,697 A | 6/1998 | Hall | |
| 5,978,307 A | * 11/1999 | Proebsting et al. .... 365/230.05 |
| 5,999,478 A | * 12/1999 | Proebsting ............. 365/230.05 |
| 6,311,258 B1 | * 10/2001 | Gibson et al. .............. 711/200 |
| 6,330,623 B1 | 12/2001 | Wu et al. | |

OTHER PUBLICATIONS

Microsoft Press Computer Dictionary, Third Edition, 1997, p. 433.*

* cited by examiner

*Primary Examiner*—Donald Sparks
*Assistant Examiner*—Christian P. Chace
(74) *Attorney, Agent, or Firm*—Morrison & Foerster LLP

(57) ABSTRACT

A data formatter includes a shift register and a pointer manager. The shift register receives data from a providing RAM and shifts that data in response to reading data from the providing RAM and writing data to a receiving FIFO. A pointer manager maintains a pointer that points to a first valid byte in a sub-block of data into the correct bytes lanes of the FIFO by moving the pointer as data is shifted into and out of the shift register.

35 Claims, 5 Drawing Sheets

DATA FORMATTER FOR SHIFTING DATA TO CORRECT DATA LANES

CROSS-REFERENCE TO RELATED APPLICATIONS

This application claims priority to U.S. Provisional Application Ser. No. 60/309,064, entitled DATA FORMATTER and filed on Jul. 30, 2001.

BACKGROUND

In computer systems, a central processing unit (CPU) may access memory by providing an address that indicates a unique location of a group of memory cells that collectively store a data element. A number of operations may be taken when performing an initial access to memory. These operations may make the initial access relatively slow. For example, certain control signals may be issued to begin the process. Next, the address may be sent to the memory. Then, the data itself may be transferred. Because of this operational overhead, or latency, the initial access to memory may take a relatively long time, e.g., four to seven clock cycles in many devices.

To reduce the latency of the memory, some memory devices read a block of data including four 64-bit words (256 bits or 32 bytes) from memory consecutively for each access. An advantage of this "burst access mode," or "bursting," is avoiding repetition of the overhead of the initial access for the subsequent three accesses. The subsequent accesses may be shortened to one to three clock cycles instead of four to seven clock cycles.

A memory device that supports bursting may not be byte-addressable. Instead of accessing a memory location at a specific byte address, the memory device may retrieve a multi-byte block of data elements. Some of the data elements in the block of data may not be valid for the request.

A data formatter may be used to take a multi-block of data from a source, such as a random access memory (RAM), and break up the multi-byte block into multiple smaller blocks. Each of the smaller blocks can then be sent to the appropriate local memory addresses.

A controlling program determines the size of each of the smaller blocks and their destination addresses. The smaller blocks may be broken up on any byte boundary within the larger block. The destination addresses may also be located at any byte boundary. This complicates the data formatter's responsibilities. No matter which byte lanes the data elements are in when they come from the providing RAM, the data formatter must ensure that these bytes are in the correct byte lanes for writing to a new address.

SUMMARY

A data formatter includes a shift register and a pointer manager. A providing random access memory (RAM) stores data from a multi-byte block of data, retrieved in a burst access operation to a memory, to be written to local memory addresses. The shift register receives data from the providing RAM and shifts that data in response to reading data from the providing RAM and writing data to a receiving first-in first-out (FIFO) memory. A pointer manager maintains a pointer that points to a first valid byte in a sub-block of data into the correct bytes lanes of the FIFO by moving the pointer as data is shifted into and out of the shift register.

The pointer manager generates indicators based on the pointer value which notify the controlling program that the shift register is full (or almost full) or empty (or almost empty).

DETAILED DESCRIPTION

Figure 1:
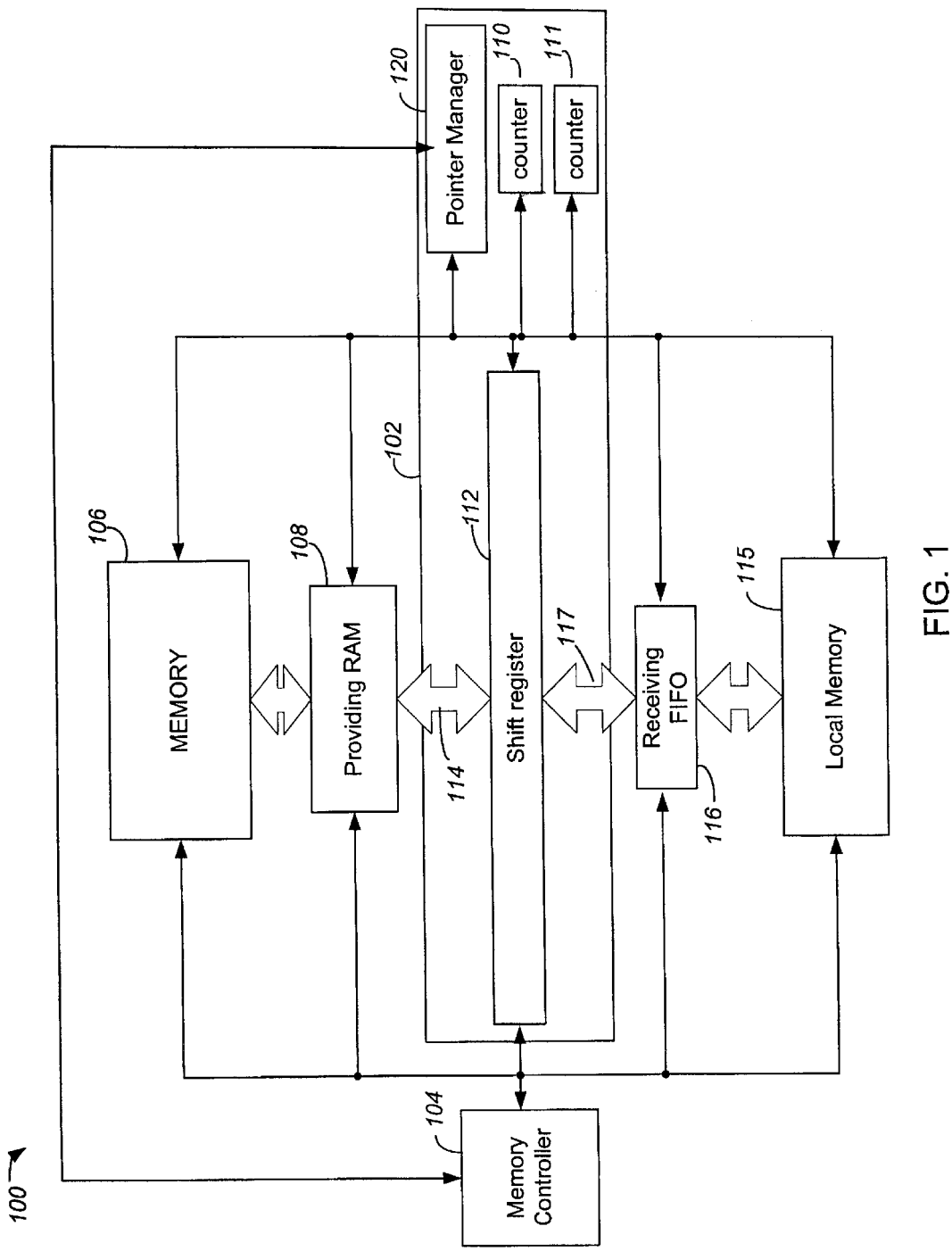
FIG. 1 is a block diagram of a memory access system according to an embodiment.

FIG. 1 illustrates a memory access system 100 including a data formatter 102 according to an embodiment. A memory controller 104 may read data from a memory device 106 in a "burst access" mode in which multi-byte blocks of data are retrieved from memory and loaded temporarily into another memory device, such as a random access memory (RAM), before being sent to local memory addresses. Some of the data elements in the block of data may not be valid for the request. Also, valid blocks of data and their destination addresses may be located on any byte boundary in the burst-accessed multi-byte blocks.

The data formatter 102 may take a block of data from a providing RAM 108 and send the data to one or more local memory addresses. The data formatter 102 is capable of breaking up the larger multi-byte block of data read from providing RAM 108 into multiple smaller blocks at the appropriate byte boundaries within the larger block. Each of the smaller blocks may be be sent to a destination address in a local memory 115. The memory controller 104 determines the size of each of the smaller blocks and their destination addresses.

Figure 2:
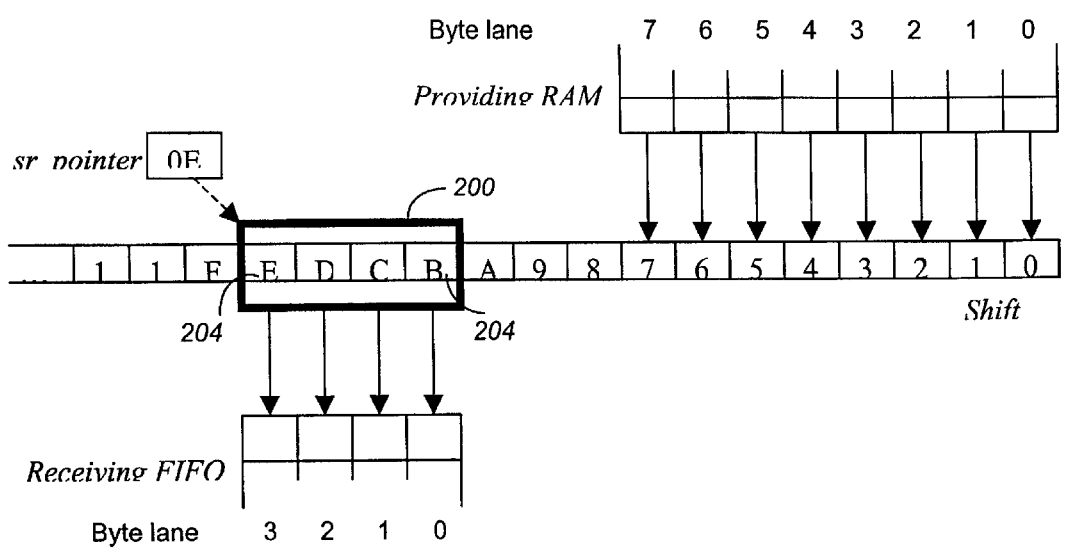
FIG. 2 is a block diagram of a shift register including a pointer in a movable window of data elements to be written.

The data formatter 102 may include counters 110 to keep track of how many bytes from the current large block from the providing PAM 108 have been written to each of the destination addresses. The data formatter 102 shifts data to the correct byte lanes for writing to a new address regardless of which byte lanes the data elements are in when received from the providing RAM 108. For example, in a block of four bytes, the first two bytes may need to be written to address 2, the third byte may need to be written to address 10, and the fourth byte may need to be written to address 7. If the memory bus is 4 bytes wide, as shown in FIG. 2, the first two bytes may need to be in byte lanes 2 and 3, respectively, while the third byte may need to be in byte lane 3, arid the fourth byte may need to be in byte lane 4.

The data formatter 102 includes a shift register 112 which shifts the data to the correct byte lanes. The data formatter may use another set of counters 111 to track and determine the correct byte lanes at any given moment. Then, based on these values, certain parameters, and its current state, the data formatter 102 shifts the data to the proper position, i.e., correct byte lanes, before allowing the data elements to be written to a receiving FIFO (First-In/First-Out) register or RAM 116.

Data elements are written into the shift register from the providing RAM's data bus 114 when the RAM 108 is read. A RAM read strobe from the memory controller 104 signals to the shift register 112 that a read has occurred. When a read occurs, the data in the entire providing RAM's data bus may be copied into the lowest part of the shift register 114, and data from lower parts of the shift register may be shifted into the higher parts of the shift register. Data at the highest parts of the shift register may be lost.

The width of the shift register 112 depends on the degree of mismatch between the providing RAM's speed and word width and the receiving FIFO's speed and word width. For minor mismatches, a shift register width of four times that of the providing RAM's data bus width may be sufficient.

A pointer manager 120 controls a window 200 of bytes in the shift register 112, as shown in FIG. 2. The window 200 includes a pointer which points to the lowest byte 202 of the word that will be written next to the receiving FIFO 116 and a pointer (sr_pointer) which points the highest byte 204 of the word that will be written next to the receiving FIFO 116. The sr_pointer factors in an address offset provided by the memory controller 104 to ensure that the first byte written to the receiving FIFO 116 is in the correct byte lane.

The pointer manager 120 may monitor operations involving the providing RAM 108, receiving FIFO 116, memory controller 104, and external memory addresses and associated byte enables in order to manage the pointers. For example, the pointer will be shifted higher by the amount of data read in from the providing RAM 108. When data elements are written to the receiving FIFO 116, the pointer decrements by the number of bytes that were written out. However, if data is being read in from the providing RAM 108 and being written into the receiving FIFO 116 at the same time, the pointer value will depend on how many valid bytes are being written into the receiving FIFO 116. In this case, the value of the pointer will be decreased by the number of valid bytes being written into the receiving FIFO and will be increased by the number of bytes being read from the providing RAM 108. The actual value is determined by the equation $$ram1\_db\_width - bytes\_enabled$$

where "ram1_db_width" represents to the width of the providing RAM's data bus 114 in bytes, and "bytes_enabled" represents the number of bytes that were written to the receiving FIFO 116.

Bytes_enabled may be set by the memory controller 104 and is used for every write to the receiving FIFO 116 for a given external memory address. It is expected that all write operations to the receiving FIFO 116 will contain fully valid words that are the width of ram2_db_width (i.e., the width of the receiving FIFO's data bus 117 in bytes) except for possibly the first and last writes to a given external memory address. In the case of the first read from the providing RAM 108 destined to be written to a new address, if bytes_enabled is not set to the same value as ram2_db_width, less than a full word of data was written to the receiving FIFO 116. For this case and the case of any last write to a receiving FIFO, bytes_enabled adjusts the pointer so that it represents the amount of data left in the shift register 112.

Figure 3:
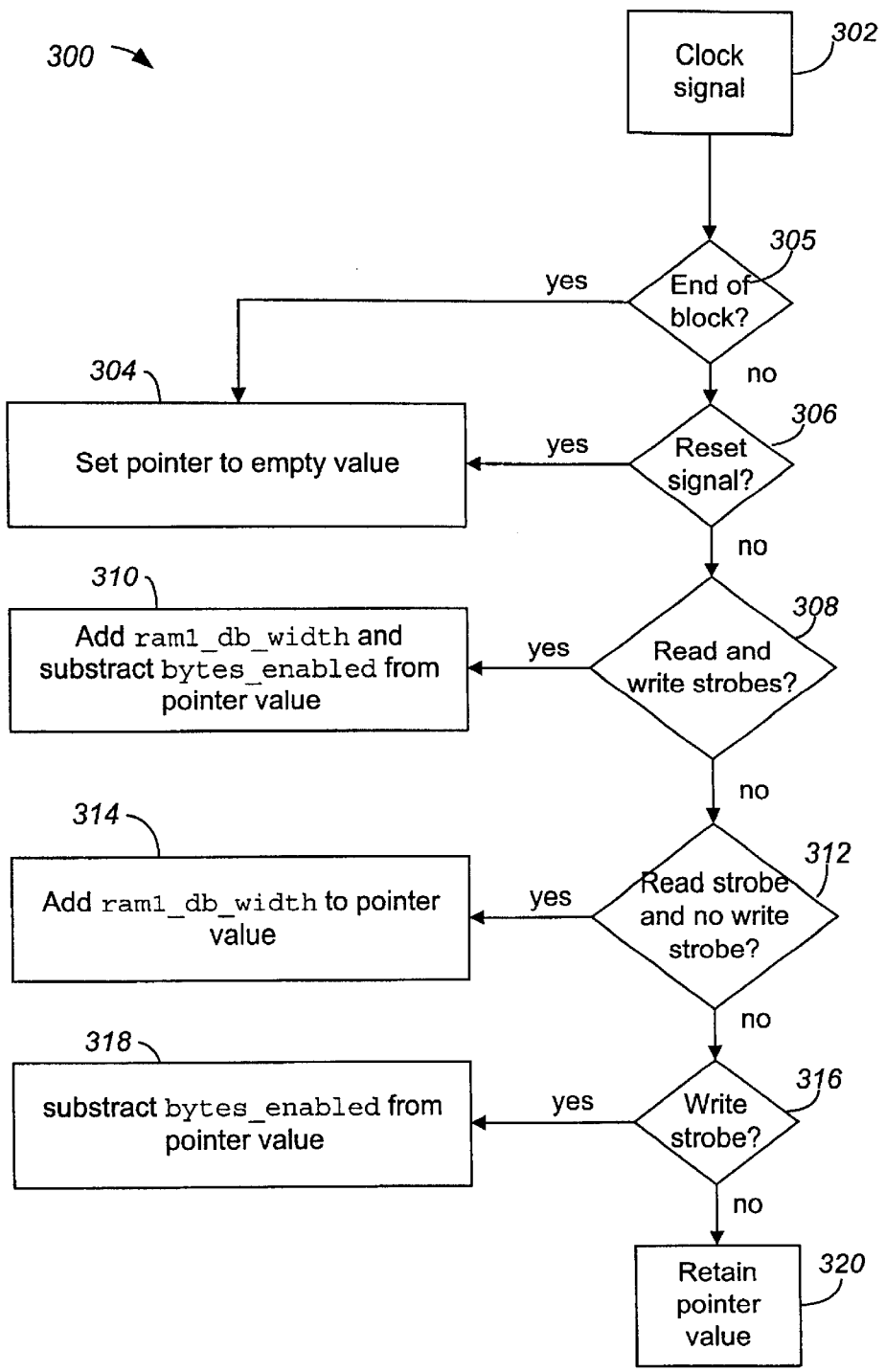
FIG. 3 is a flowchart describing a pointer management operation according to an embodiment.

FIG. 3 illustrates a flowchart describing a pointer management operation 300 according to an embodiment. The following is a Verilog language description of the operation 300:

```
always @ (posedge clock or posedge reset)
begin
    if (reset)
        pointer[4:0] <= 5'h1F;
    else if (pointer_reset)
        pointer[4:0] <= 5'h1F;
```

-continued

```
    else if (read_strb & write_strb)
        pointer[4:0] <= pointer[4:0] + (`ram1_db_width -
            bytes_enabled[`ram2_db_width:0]);
    else if (read_strb & !write_strb)
        pointer[4:0] <= pointer[4:0] + `ram1_db_width;
    else if (write_strb)
        pointer[4:0] <= pointer[4:0] -
            bytes_enabled[`ram2_db_width:0];
    else
        pointer[4:0] <= pointer[4:0];
end
assign sr_pointer[4:0] = pointer[4:0] +
    address_offset[`r2_log2-1:0];
```

The pointer managment operation 300 executes on a clock signal (block 302). When a new starting address for the external memory is introduced, the pointer manager 120 changes a pointer offset value to a new value if the received bytes need to be shifted to different lanes from a default position. This new starting address is saved as the signal "address_offset", and the sr_pointer is assigned a value described by the equation:

$$sr\_pointer = pointer[4:0] + address\_offset[`r2\_log2-1:0],$$

where r2_log2 is the base 2 logarithm of the ram2_db_width parameter, i.e., the width of the receiving FIFO's data bus in bytes.

The pointer manager 120 resets the pointer to a value indicating that the shift register 114 is empty whenever a block of data, as defined by the memory controller 104, ends and another block begins (block 305). In this example, the empty value is hexadecimal value 1F. The pointer may also be reset to the empty value if the pointer reset signal is issued by the memory controller 104 (block 306).

The memory controller 104 indicates when data is written into the receiving FIFO 116 by sending a write strobe signal to the pointer manager 120. The memory controller 104 indicates when data is read from the providing RAM 108 by sending a read strobe signal to the pointer manager 120.

If a read strobe and a write strobe are received in the same clock cycle (block 308), the pointer manager 120 changes the pointer value to a value which equals the pointer's current value plus the width of the providing RAM's data bus 114 in bytes minus the bytes_enabled value (block 310). The bytes_enabled value will be the width of the receiving FIFO' data bus 117 in bytes for any writes other than perhaps the first or last writes.

If a read strobe is received, but no write strobe in a clock cycle (block 312), the pointer manager 120 changes the value of the pointer to a value which equals its current value minus the bytes enabled value (block 314).

If the pointer manager 120 determines that neither of the last two conditions were true and a write strobe is received (block 316), the pointer manager 120 changes the value of the pointer to a value which equals its current value plus the width of the providing RAM's data bus 114 in bytes (block 318).

If the pointer manager determines that none of the previous conditions are true (block 320), the pointer manager 120 does not change the pointer value (block 322).

Consider the following example of a pointer management operation 300. Assume the following conditions:
ram1_db_width=8 (bytes)
ram2_db_width=4 (bytes)
number of bytes in shift register=32
address_offset=3

In this example, fifteen bytes are to be written to an external memory address of 3. This will require two 8-byte reads from the providing RAM, and five 4-byte writes to the receiving FIFO (not four, due to the address offset).

Figure 4:
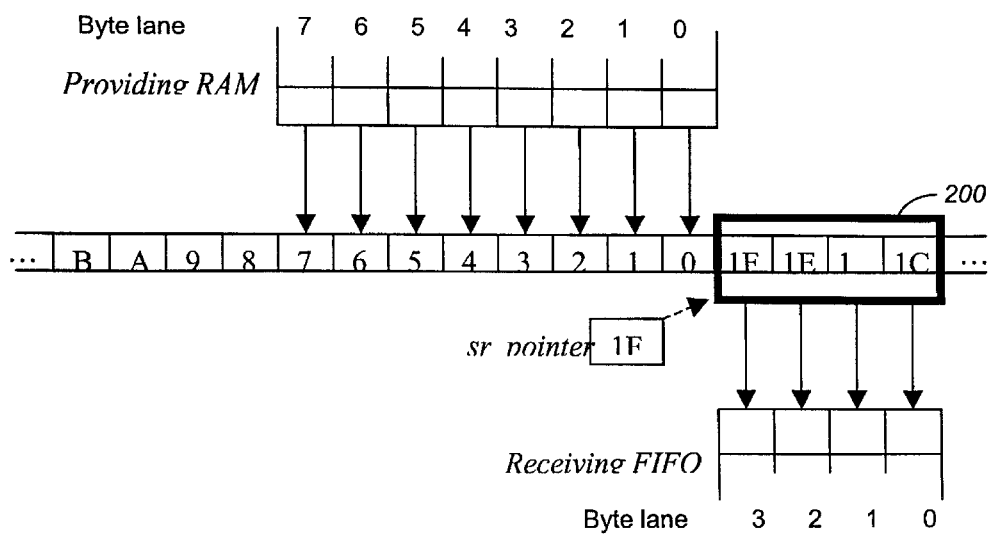
FIGS. 4 to 7 are a block diagrams of the shift register of FIG. 2 including the window in different positions corresponding to different phases of an exemplary pointer management operation.

The pointer begins with a value 5'h1F, indicating that the shift register is empty, as shown in FIG. 4. The address offset is set to 3 when the memory controller 104 assigns a new external memory address destination for the forthcoming data.

Figure 5:
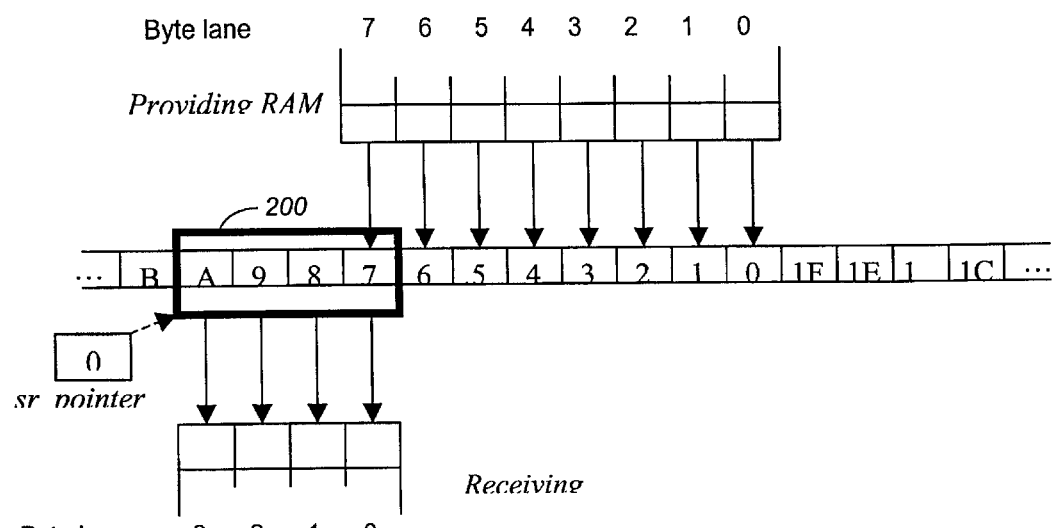

Next, a read strobe occurs, indicating to the pointer manager 120 that eight bytes of data have been placed in the shift register 112. The pointer manager 120 adds eight to pointer's value, changing the pointer value to 5'h1F+4'h8= 5'h07. The value wraps from 5'h1F to 5'h00 since the shift register 112 is at its highest possible value at 5'h1F. The first bytes to be written into the receiving FIFO are those ones located in bytes A, 9, 8, and 7 of the shift register 112, since the sr_pointer equals 5'h07+2'h3=5'h0A, as shown in FIG. 5. Bytes 7 down to 0 are the valid bytes in the shift register. Thus, byte 7 of the shift register is the first valid byte read from the providing RAM 108. Byte 7 is "shifted" into byte lane 0 for the receiving FIFO 110. This shift happens because of the address_offset. This same amount of shift will be in effect for all data written into the receiving FIFO 116 until the memory controller 104 issues a new external memory address.

Figure 6:
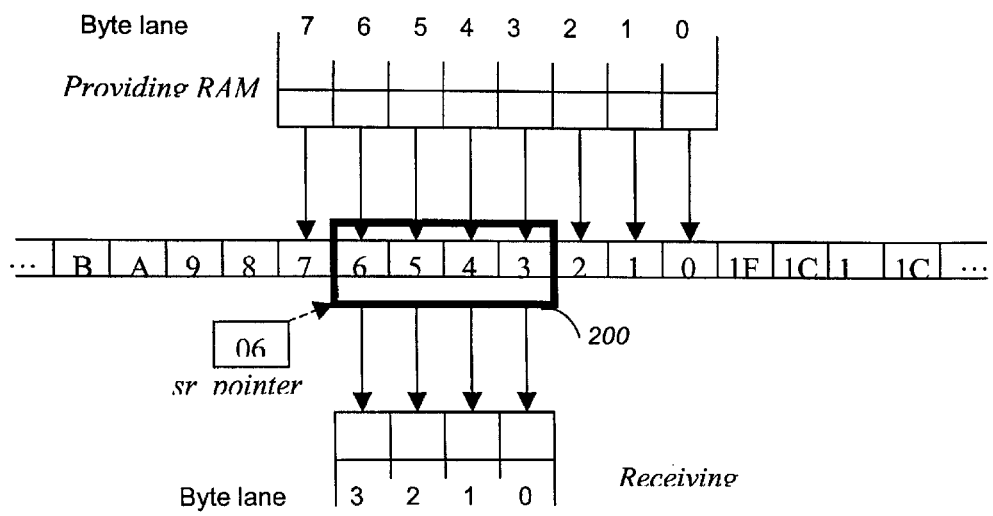

After the next clock, assume that a write strobe occurs, with no read strobe. Bytes_enabled is 4, but this is a dummy value, which is the case on the first write. This allows the pointer to advance to the proper position with all possible offsets. In reality, only one byte was written to external memory. The pointer manager 120 changes the pointer's value to 5'h07−3'h4=5'h03, as shown in FIG. 6. The next bytes that will be written into the receiving FIFO 116 are the ones located in bytes 6, 5, 4, and 3 of the shift register, since the sr_pointer equals 5'h03+2'h3=5'h06.

After the next clock, assume that a read strobe and a write strobe occur simultaneously. Data that were in bytes 7 through 0 are moved into bytes 15 through 8, to make room for the new data read in. Data that were in bytes 15 through 8 are moved into bytes 23 through 16, and so on. Bytes_enabled is 4. The pointer manager 120 changes the pointer's value based on two factors: read and write. The pointer's value is changed to 5'h03+4'h8−3'h4=5'h07, as shown in FIG. 5. The next bytes that will be written into the receiving FIFO are the ones located in bytes A, 9, 8, and 7 of the shift register, since the sr_pointer equals 5'h07+2'h3=5'h0A.

On the next clock, assume that only a write strobe is occurring, with no read strobe. Bytes_enabled is 4. The pointer manager 120 changes the pointer's value to 5'h07−3'h4=5'h03, as shown in FIG. 6. The next bytes that will be written into the receiving FIFO are the ones located in bytes 6, 5, 4, and 3 of the shift register, since the sr_pointer equals 5'h03+2'h3=5'h06.

Figure 7:
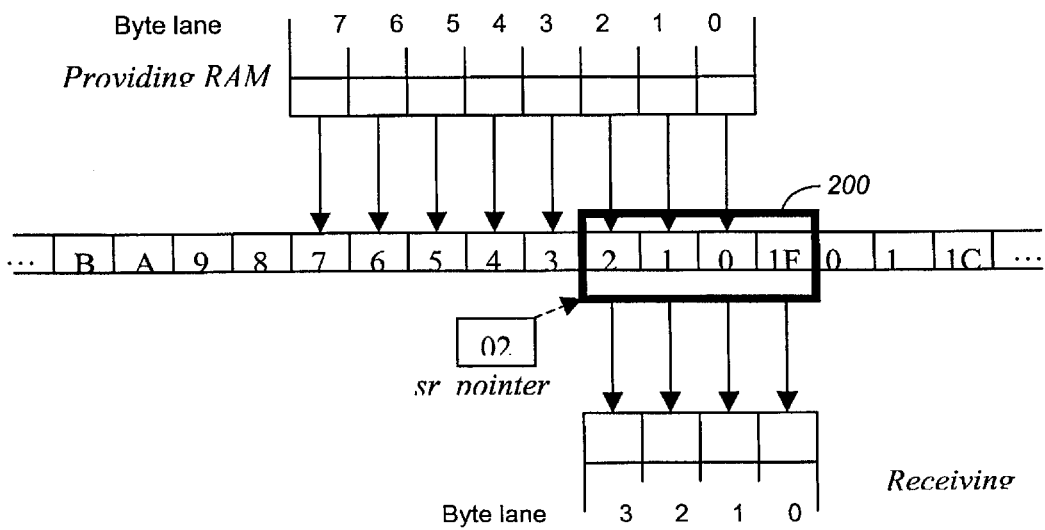

On the next clock, again there is only a write strobe occurring, with no read strobe. Bytes_enabled has a value of 4. Pointer changes its value to 5'h03−3'h4=5'h1F, as shown in FIG. 7. The next bytes that will be written into the receiving FIFO are the ones located in bytes 2, 1, 0, and 1F of the shift register, since the sr_pointer equals 5'h1F+2'h3=5'h02.

On the last clock, again assume that only a write strobe is occurring, with no read strobe. Bytes enabled has a value of 2. Pointer changes its value to 5'h02−3'h2=5'h00. No more bytes will be written into the receiving FIFO.

Note that now, pointer has a value of 5'h00. A value of 5'h1F would indicate that the shift register is empty, but this is not the case. Instead, this value indicates that there is one more byte of possibly valid data in the shift register. This byte may or may not be written to a different external memory address. This depends on what the memory con-troller 104 wants to do with the byte. If this byte of data is not valid at all, pointer_reset signal will be asserted by the memory controller 104 before a new external memory address is issued. There will be no more writes to the receiving FIFO 116, since bytes_enabled can only be less than ram2_db_width for the last write of a block of data designated for a given address. For this example, this is where the reading and writing are complete.

Another function of the shift register 112 may be to notify the memory controller 104 not to read from the providing RAM 108 or not to attempt to write data to the receiving FIFO 116. These are temporary conditions that may be used to keep the memory controller 104 from performing these functions until the shift register 112 is in a condition to allow normal operation. The pointer's value indicates that the shift register 112 is almost full or almost empty and may be used to signal the temporary notification, e.g., by setting flags. For example, if the shift register 112 is almost full, it indicates this condition to the memory controller 104. The shift register 112 may stay in this condition until a write strobe occurs, which will make room for read data without pushing unwritten data out of the shift register 112. The actual combination of events that allow reads to continue may be different, depending on the implementation.

When the shift register 112 is almost empty, this status can be signaled to the memory controller 104 when the pointer is within a few bytes of being empty, depending on the implementation. The shift register 112 may stay in this condition until a read strobe occurs, indicating that there is data available to write to the receiving FIFO 116. As before, the actual combination of events that allow writes to continue may be different, depending on the implementation.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

What is claimed is:

1. A method comprising:
   receiving unaligned data from a first memory device at a shift register;
   receiving a destination address;
   determining an address offset value for the destination address;
   in response to the address offset value, moving a window to a sub-block of data elements in the shift register to be written to a secondary memory device, the window having byte lanes corresponding to byte lanes in the second memory device; and
   without switching the data elements in the sub-block, writing each of the data elements in the sub-block to the second memory device such that each data element is in a correct data lane.

2. The method of claim 1, wherein the data lanes comprise byte lanes.

3. The method of claim 1, wherein said receiving data comprises receiving a block of data elements.

4. The method of claim 3, wherein said receiving comprises burst accessing a memory to retrieve a multi-byte block of data.

5. The method of claim 4, wherein the block of data comprises data elements which are not valid for the access.

6. The method of claim 1,
   wherein said first memory device has a first bus width and the shift register has a second bus width.

7. The method of claim 6, wherein the second bus width is larger than the first bus width.

8. The method of claim 1, wherein said moving the window comprises changing a pointer value to a data element location corresponding to a first valid data element in a sub-block of data to be written to the second memory device.

9. The method of claim 8, wherein said changing comprises changing the pointer value by a number of data locations in the shift register, said number corresponding to the size of the received data.

10. The method of claim 8, wherein said changing comprises incrementing the pointer value by a number of byte locations corresponding to the byte-size of the received data.

11. The method of claim 10, wherein said changing comprises decrementing the pointer value by a number of byte locations corresponding to the byte-size of the written data.

12. The method of claim 8, further comprising indicating a condition of the shift register in response to a pointer value.

13. The method of claim 12, wherein said condition is an empty condition.

14. The method of claim 12, wherein said condition is a full condition.

15. Apparatus comprising:
   a memory controller operative to control an access to a first memory device and assign destination addresses to data elements retrieved in said access;
   a providing memory device operative to receive a plurality of data elements retrieved in the access;
   a receiving memory device having a plurality of data lanes and being operative to receive a plurality of data elements to be written to a local memory device from the providing memory device; and
   a data formatter comprising
   a shift register operative to receive data elements from the providing memory device and write data elements to the receiving memory device, and
   a pointer manager operative to determine an address offset value for a destination address and to move a window to a sub-block of data elements in the shift register in response to the destination address, the window having byte lanes corresponding to byte lanes in the second memory device and, without switching the data elements in the sub-block, writing each of the data elements in the sub-block to the second memory device such that each data element is in a correct data lane.

16. The apparatus of claim 15, wherein the memory controller comprises a burst access memory operative to control a burst access which retrieves a multi-byte block of data.

17. The apparatus of claim 15, wherein the providing memory device comprises a random access memory (RAM).

18. The apparatus of claim 15, wherein the receiving memory device comprises a first-in first-out (FIFO) memory.

19. The apparatus of claim 15, wherein the providing memory device has a first bus width and the shift register has a second bus width, and
   wherein the second bus width is larger than the first bus width.

20. The apparatus of claim 19, wherein the second bus width is four times larger than the first bus width.

21. The apparatus of claim 15, wherein the pointer manager is operative to change a pointer value to a data element location in the shift register corresponding to a location of a first valid data element in the sub-block of data to be written to a second memory device.

22. The apparatus of claim 21, wherein the pointer manager is operative to generate a signal indicative of a condition of the shift register in response to the pointer value.

23. The apparatus of claim 22, wherein the condition is an empty condition.

24. The apparatus of claim 22, wherein the condition is a full condition.

25. An article comprising a machine-readable medium including machine-executable instructions, the instructions operative to control a machine to:
   receive unaligned data from a first memory device at a shift register;
   receive a destination address;
   determine an address offset value for the destination address;
   in response to the address offset value, move a window to a sub-block of data elements in the shift register to be written to a secondary memory device, the window having byte lanes corresponding to byte lanes in the second memory device; and
   without switching the data elements in the sub-block, write each of the data elements in the sub-block to the second memory device such that each data element is in a correct data lane.

26. The article of claim 25, wherein the data lanes comprise byte lanes.

27. The article of claim 25, wherein the instructions operative to cause the machine to receive data comprise instructions operative to cause the machine to receive a block of data elements.

28. The article of claim 25, wherein the instructions operative to cause the machine to move the window include instructions operative to cause the machine to change a pointer value to a data element location corresponding to a first valid data element in a sub-block of data to be written to a second memory device.

29. The article of claim 28, further comprising instructions causing the machine to indicate a condition of the shift register in response to a pointer value.

30. The article of claim 29, wherein said condition is an empty condition.

31. The article of claim 29, wherein said condition is a full condition.

32. An apparatus comprising:
   a first parallel memory device having a first length;
   a second parallel memory device having a second length, the second length being different than the first length;
   a serial register between the first and second parallel memory devices, the serial register operative to receive data elements from the first parallel memory device and to write a data elements to the second parallel memory device;
   a pointer manager operative to move a window to a sub-block of data elements in the serial register in response to a destination address, the window having byte lanes corresponding to byte lanes in the second memory device and, without switching the data elements in the sub-block, writing each of the data elements in the sub-block to the second parallel memory device such that each data element is in a correct data lane.

33. The apparatus of claim 32, wherein the first parallel memory device comprises a RAM.

34. The apparatus of claim 32, wherein the second parallel memory device comprises a FIFO.

35. The apparatus of claim 32, where in the serial register comprises a shift register.

* * * * *